D. E. Peck,

Door Check.

No. 102,427. Patented Apr. 26, 1870.

Witnesses,
E. A. Shepard.
H. P. Bradley

Inventor,
Doen E. Peck
By James Shepard

United States Patent Office.

DEON E. PECK, OF BURLINGTON, CONNECTICUT.

Letters Patent No. 102,427, dated April 26, 1870.

IMPROVEMENT IN ELASTIC DOOR-GUARDS.

The Schedule referred to in these Letters Patent and making part of the same.

I, DEON E. PECK, of Burlington, in the county of Hartford and State of Connecticut, have invented certain Improvements in Elastic Door-Guards, of which the following is a specification.

My invention consists in the employment of a rivet or its equivalent, the head of which is enveloped in an India-rubber or gum-elastic ball, and secured to the end of an ordinary door-stop by the body or shank of said rivet.

In the accompanying drawings—

Figure 1:
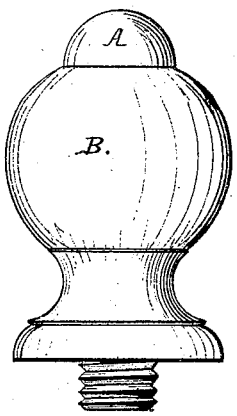
Figure 2:
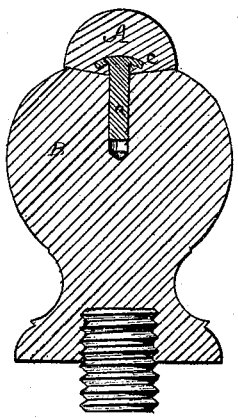

Figure 1 is a side elevation, and
Figure 2 a longitudinal section of my invention.
A designates the India-rubber ball, and
B the door-stop.

$a$ designates the rivet, the head $c$ of which may be of various forms, with any suitable foss or shoulder projecting beyond the body of the same, but I prefer a round head formed so as to leave the under side of the head hollowing, as shown in fig. 2.

The head $c$ is placed in the mold for casting the ball A, so as to be enveloped by the same in the process of casting, thus firmly securing the ball A to the rivet-head $c$.

Although I consider casting the ball A to the head $c$ as the most preferable mode, the ball A might be cast with a suitable cavity in it to receive and hold the head $c$, the same being inserted after the ball is cast.

When the ball A is secured to the rivet $a$, as described, the rivet is driven into the door stop B, by blows on the end of the ball A, when the rivet will firmly hold the ball in place.

If desired the rivet $a$ might be serrated or threaded to hold it in place with greater security.

Although my invention is principally designed for door-stops, it will be found useful as a guard for furniture, slate-frames, and other articles.

I am aware that screws have been made with a hollow shut-metal head, in which an India-rubber ball is placed for a similar purpose, as shown by the patent to G. R. Wilmot, April 9, 1861.

By use the ball is very liable to become loose and drop out of the head; such a rubber-headed screw or rivet I expressly disclaim. By inclosing the rivet-head on the ball it is secured in a much more durable manner.

I claim as my invention—

As a new article of manufacture, a door or furniture stop, consisting of the stop B and rivet $a$, with its head $c$ embedded in the interior of the India-rubber ball A, the whole constructed and arranged substantially as shown and described.

DEON E. PECK.

Witnesses:
JAMES SHEPARD,
H. A. SEYMOUR, Jr.